United States Patent
Ramp et al.

(10) Patent No.: US 8,464,885 B2
(45) Date of Patent: Jun. 18, 2013

(54) INSIDE STAY AND INSIDE STAY BERM UNIT

(75) Inventors: Gregory D. Ramp, Boise, ID (US); Bao Truong, Meridian, ID (US)

(73) Assignee: Argonaut Inflatable Research and Engineering, Inc., Meridian, ID (US)

( * ) Notice: Subject to any disclaimer, the term of this patent is extended or adjusted under 35 U.S.C. 154(b) by 146 days.

(21) Appl. No.: 13/007,603

(22) Filed: Jan. 15, 2011

(65) Prior Publication Data

US 2011/0174813 A1    Jul. 21, 2011

Related U.S. Application Data

(60) Provisional application No. 61/295,644, filed on Jan. 15, 2010.

(51) Int. Cl.
    *B65D 33/02*      (2006.01)

(52) U.S. Cl.
    USPC .............................................. 220/9.2; 220/9.1

(58) Field of Classification Search
    USPC .................. 220/571, 573, 646–647, 9.1, 9.3, 220/9.4; 405/110, 112, 52, 107, 115; 588/900
    See application file for complete search history.

(56) References Cited

U.S. PATENT DOCUMENTS

| | | | |
|---|---|---|---|
| 5,316,175 A | | 5/1994 | Van Romer |
| 5,762,233 A | * | 6/1998 | Van Romer .................... 220/573 |
| 6,092,686 A | * | 7/2000 | Shaw et al. .................... 220/573 |
| 6,880,720 B2 | | 4/2005 | Van Romer |
| 6,880,721 B1 | * | 4/2005 | Barrett et al. .................. 220/573 |
| RE39,971 E | * | 1/2008 | Van Romer .................... 220/573 |
| 7,506,777 B2 | * | 3/2009 | Ramp et al. .................... 220/9.4 |
| 8,016,151 B2 | * | 9/2011 | Barrett et al. .................. 220/573 |
| 2003/0029873 A1 | | 2/2003 | Moffat |
| 2008/0152431 A1 | * | 6/2008 | Ramp et al. ..................... 405/52 |

* cited by examiner

*Primary Examiner* — J. Gregory Pickett
*Assistant Examiner* — Kaushikkumar Desai
(74) *Attorney, Agent, or Firm* — Charles R. Clark (57) ABSTRACT

An inside stay berm unit incorporates a plurality of inside stays each stay connected to the interior of the berm unit by a plurality of stay securement tapes. Each respective stay is a respective closed ring after the stay is threaded through and retained within at least one respective wing aperture in at least one floor stay securement tape and at least one wing aperture in at least one sidewall stay securement tape and through at least one wing loop aperture in a sidewall top edge stay securement tape and closed by a closure means. The invention allows easy removal and replacement of any damaged stays.

16 Claims, 12 Drawing Sheets

INSIDE STAY AND INSIDE STAY BERM UNIT

BACKGROUND OF THE INVENTION

In modern society, efforts are ongoing to prevent or lessen environmental impacts resulting from leaking of petroleum products and other chemicals into the environment. Efforts are made by petroleum industry workers, chemical industry workers, transportation industry workers, military personnel, governmental workers, and other workers involved in liquid and chemical containment to guard against environmental contamination resulting from undesired release into the environment of various liquids and chemicals. Various portable spill prevention capture and control berm units and systems have been developed as tools in the ongoing efforts by society to contain liquids and other flowable materials. Many spill prevention capture and control berm units are constructed from petroleum and chemically resistant flexible coated fabrics including polyester yarn fabrics coated with polyurethane or polyvinyl chloride or other suitable coating material and many of these spill prevention capture and control berm units have flexible sidewalls held in an erect condition by sidewall stays.

An object of the present invention is to provide a compact and easily deployable (erectable) berm unit having a plurality of novel easily replaceable cooperating inside stays and a plurality of stay securement tapes that is more convenient and easier to use than prior art berm units.

Another object of the invention is to provide a undeployed, compactly folded berm unit that can be quickly retrieved from a convenient storage location by a user or retrieved from within a motor vehicle by an operator of the motor vehicle and deployed (erected) quickly to capture or control spilling or leaking of materials at the location or from the motor vehicle.

The present invention relates to a novel inside stay berm unit incorporating a plurality of novel inside stays each stay connected to the interior of the berm unit by a plurality of stay securement tapes. Each respective stay is a respective closed ring after the stay is threaded through and retained within at least one respective wing aperture in at least one floor stay securement tape and at least one wing aperture in at least one sidewall stay securement tape and through at least one wing loop aperture in a sidewall top edge stay securement tape and closed by a closure means. The invention allows easy removal and replacement of any damaged stays.

Another object of the invention is to provide a plurality of inside stays that can be selectively and quickly shifted between a collapsed condition and an erect condition.

The present invention relates to a novel inside stay and inside stay berm unit that improves the utility of a portable berm unit used to contain liquids and chemicals and that helps protect against release of the liquids and chemicals into the environment.

BRIEF SUMMARY OF THE INVENTION

A principal objective of this invention is to help a person who uses a flexible portable inside stay berm unit to place more easily the berm unit in a deployed (erected) condition; selectively to maintain the unit in the deployed condition; selectively to let down a sidewall or portion of the sidewall of the berm unit; and to selectively reestablish the deployed condition. The invention is a novel inside stay berm unit using a plurality of stays attached to a plurality of stay securement tapes and thus helps lessen the likelihood of environmental contamination by liquids and chemicals contained within the control berm unit.

Figure 5:
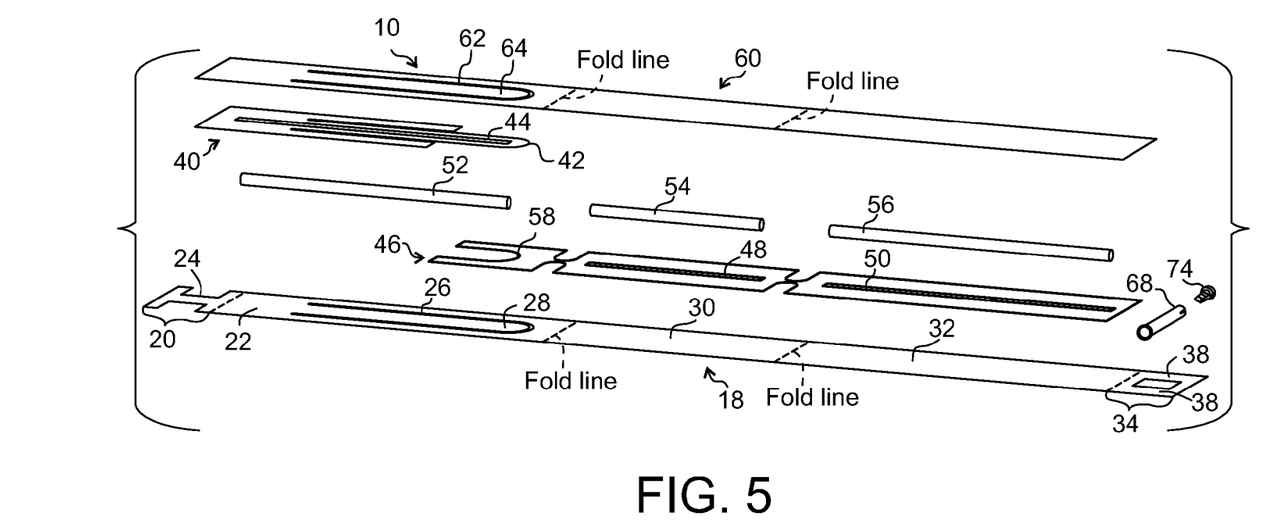
Figure 6:
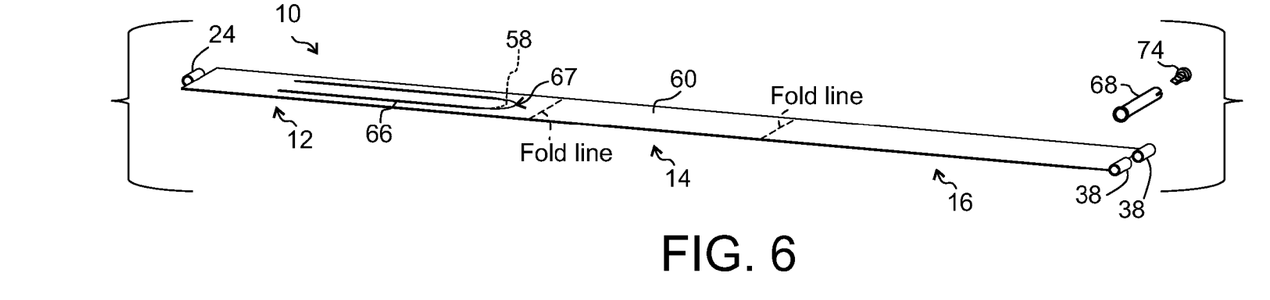
FIG. 6 is a perspective view of the inside stay 10 shown in FIG. 2a after assembly using preferably RF welding techniques and before closing of the stay into a triangular closed ring by a closure pin 68 and a closing cap 74.

Referring to FIGS. 5 and 6, when open before being incorporated into a berm unit, each stay 10 has a generally long and flat shape. Each stay is preferably made from flexible coated fabric layers joined around three generally rod shaped reinforcing members with at least one of the reinforcing members (a sidewall leg reinforcing member 56) being generally rigid.

Figures 7A, 7B, 7C:
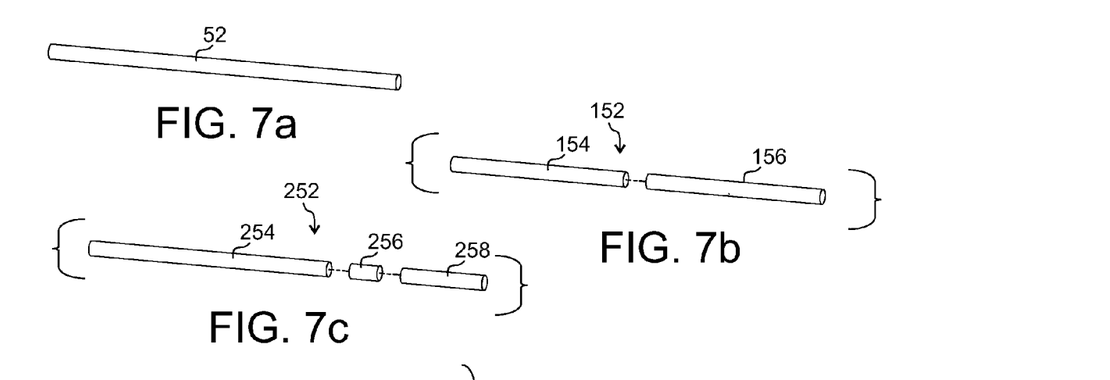
FIG. 7a is a perspective view of a preferred one piece propping leg reinforcing member 52.
FIG. 7b is a perspective view of a two-piece propping leg reinforcing member 152 having a reinforcing member proximal portion 154 adjacent, end to end to a reinforcing member distal member portion 156.
FIG. 7c is a perspective view of a three-piece propping leg reinforcing member 252 having a reinforcing member proximal portion 254 adjacent, end to end to a reinforcing member intermediate member portion 256, and said intermediate member portion adjacent, end to end to a reinforcing member distal portion 258.
Figures 8, 9, 10A, 10B, 10C:
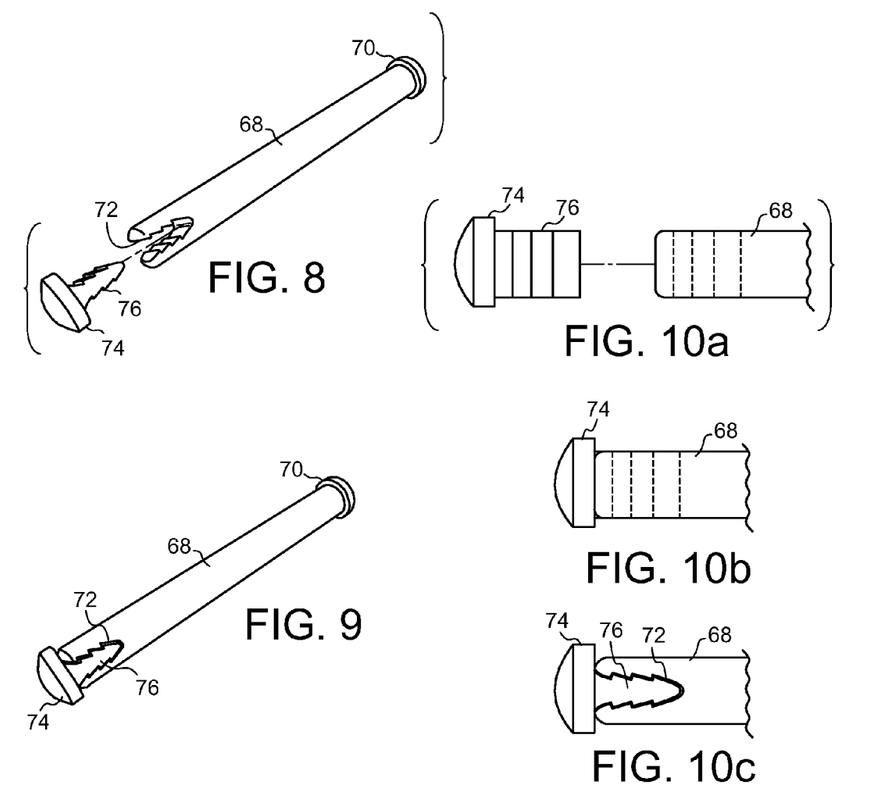
FIG. 8 is a perspective exploded view of a closure pin 68 having a closure pin end cap portion 70 and a closure pin receiving slot 72; and a cooperating closing cap 74 having a slot engaging probe 76.
FIG. 9 is a perspective view of the closure pin 68 joined and secured to the cooperating closing cap 74 by inserting said slot engaging probe 76 into said closure pin receiving slot 72.
FIG. 10a is an exploded partial top plan view of the closure pin 68 and the closing cap 74 (the dashed lines represent horizontal engaging ledges of the receiving slot 72 that closely receive in a cooperating relationship the ledges of the engaging probe 76)
FIG. 10b is an assembled partial top plan view of the closing pin 68 and the closing cap 74 joined coaxially together (the dashed lines represent horizontal engaging ledges of the receiving slot 72 that closely receive in a cooperating relationship the ledges of the engaging probe 76)
FIG. 10c is an assembled partial side plan view of the closing pin 68 and the closing cap 74 joined coaxially together (showing the engaging ledges of the receiving slot 72 closely receiving in a cooperating relationship the ledges of the engaging probe 76)
Figure 11:
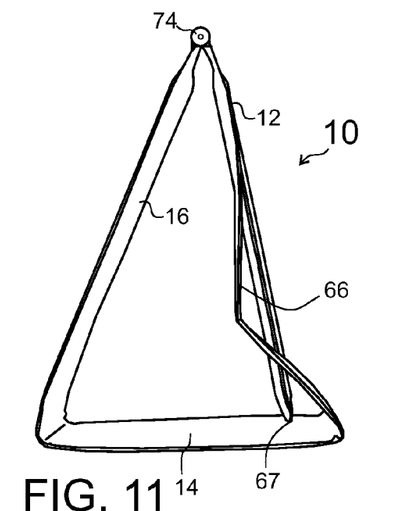
FIG. 11 is a side view of the inside stay 10 shown in FIG. 2a closed into a triangular closed ring in an erect condition with a free tip 67 of the propping leg 12 showing within the closed ring and resting upon an inner surface of a base leg 14 away from a sidewall leg 16 of the inside stay.
Figure 12:
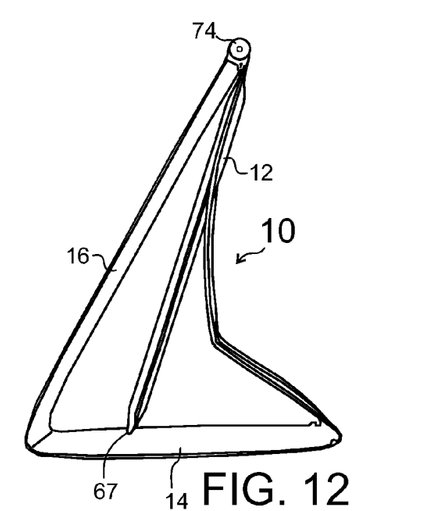
FIG. 12 is a side view of the inside stay shown in FIG. 11 in a transition folding condition between being in the erect condition and being in a collapsed condition.
Figure 13:
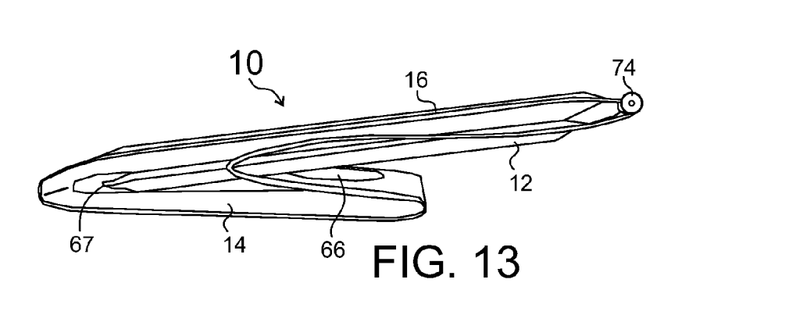
FIG. 13 is a side view of the inside stay shown in FIG. 11 in a collapsed condition.
Figure 14:
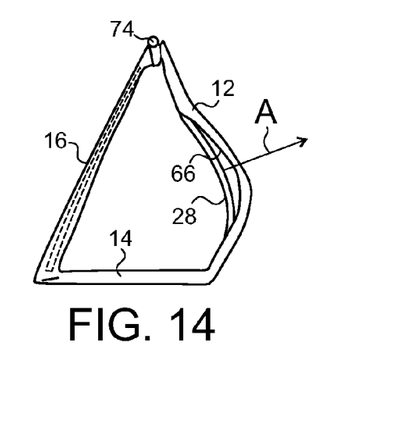
FIG. 14 is a side view of the inside stay shown in FIG. 11 being warped downward from the erect condition towards a collapsed condition and showing a bowing of the propping leg 12 in the direction of arrow A and the free tip 67 of the propping leg still retained within the closed ring.
Figure 15:
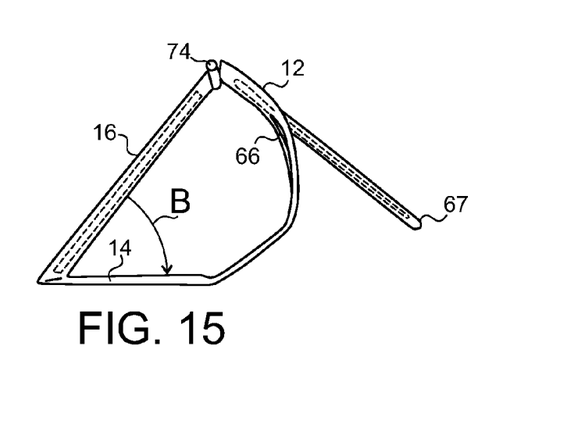
FIG. 15 is a side view of the inside stay shown in FIG. 14 showing the free tip of the propping leg having escaped outside the closed ring allowing folding of a sidewall leg 16 in the direction of arrow B down towards and alongside a base leg 14.

Referring to FIGS. 7a to 7c, the propping leg reinforcing member 52 preferably is a semi-rigid natural rubber rod with a Shore A hardness of 60 to 90 that in other embodiments of the stay could be generally rigid or could be a two-piece member 152 or a three-piece member 252. The two-piece member 152 comprises a propping leg reinforcing member proximal portion 154 located away from a base leg portion 30 and a propping leg reinforcing member distal portion 156 nearer said base leg portion. The three-piece member 252 comprises a propping leg reinforcing member alternate proximal portion 254 located away from a base leg portion 30, adjacent a propping leg reinforcing member intermediate portion 256, adjacent a propping leg reinforcing member alternate distal portion 258 nearer said base leg portion. Preferably, the proximal portions 154 and 254 and the alternate distal portion 258 are generally rigid and the intermediate portion 256 and the distal portion 156 are semi-rigid.

The stay, when folded together end to end and then closed by a closure means, forms a closed triangular ring. When incorporated into a berm unit, the stay is removably and securely attached to and between an inside sidewall and an inside portion of a floor of the berm unit.

The stays and securement tapes may be sized in a range of sizes to accommodate the various sizes and dimensions of berm units having various sizes and dimensions in use in our society.

The berm unit wall and floor blanks and stay securement tapes are preferably made from flexible coated fabric, sewn, glued, welded together, or otherwise joined and when erected by a plurality of stays form an open-topped container. In an alternative embodiment, the blanks may also be made from flexible polyethylene sheet material or some other suitable flexible impervious material.

A further object of the invention is making available to users an inside stay berm unit that is durable, easy to use, easy to secure in position, is inexpensive to manufacture, and is easy to deploy and undeploy.

Additional and various other objects and advantages attained by the invention will become more apparent as the specification is read and the accompanying figures are reviewed.

BRIEF DESCRIPTION OF THE SEVERAL VIEWS OF THE DRAWINGS

FIG. 5 is an exploded perspective view of the inside stay 10 shown in FIG. 2a;

FIG. 16 is a partially exploded top plan view of a flat inside stay berm unit 8 (stays not shown) showing a wall and floor blank 80; the floor blank comprising a central floor portion 82 surrounded by an encircling sidewall portion 84; the sidewall portion having a sidewall outer free edge; a plurality of floor stay securement tapes 110, 110' distributed around and joined to the central floor portion spaced outward from the center of the floor portion towards the sidewall portion; a plurality of lower sidewall stay securement tapes 118, 118' distributed along and joined to the sidewall portion spaced from the outer free edge; and a plurality of sidewall outer free edge stay securement tapes 126, and 126' distributed along, joined to, and proximal to the outer free edge; the stay securement tapes for receiving and retaining a plurality of inside stays (not shown); showing dashed line fold lines for forming the sidewalls and folded corner portions 86 of the sidewall; and showing a plurality of handle and hold-down anchor straps 136 with attaching hardware (rivets 98 and washers 100);

DETAILED DESCRIPTION OF THE INVENTION

Figure 1:
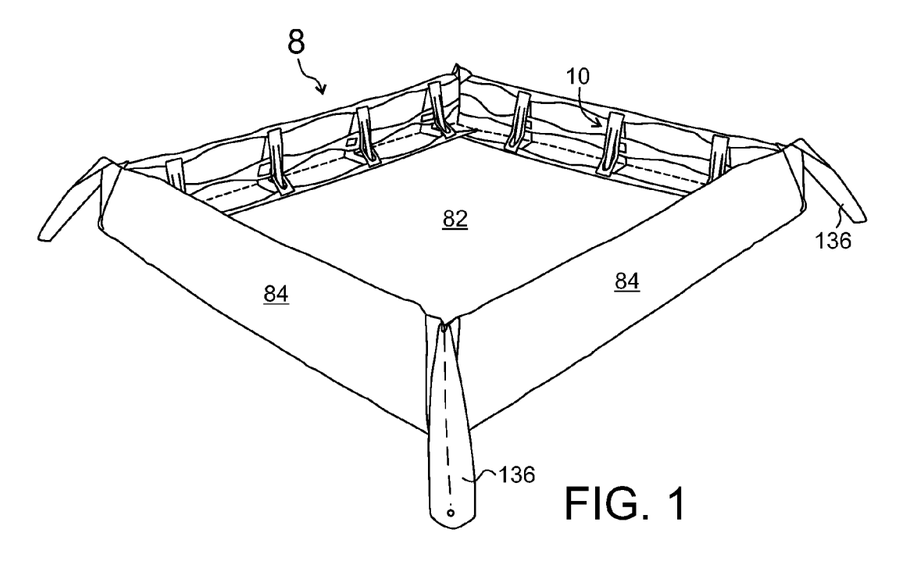
FIG. 1 is a perspective view of an inside stay berm unit 8.
Figure 18:
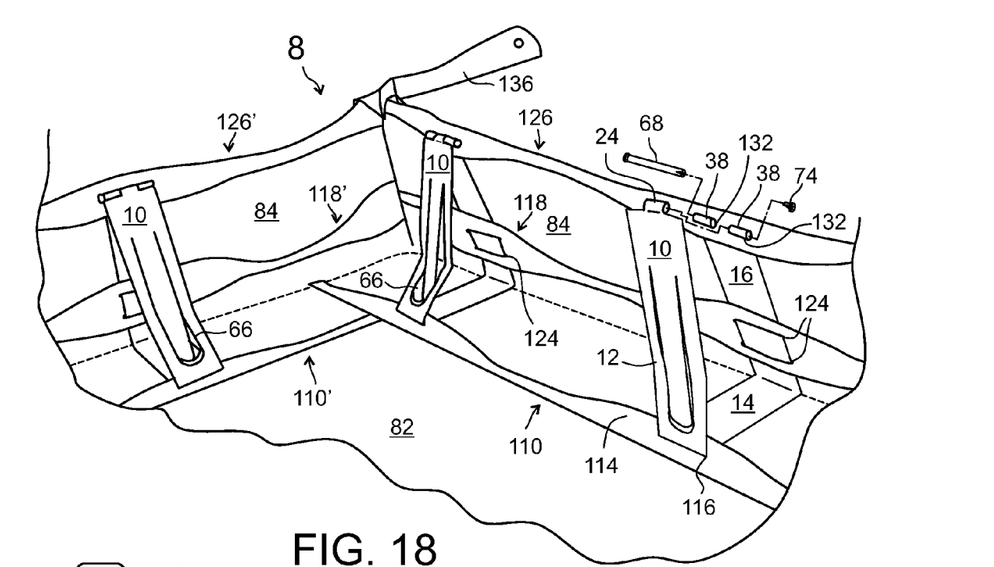
FIG. 18 is a partial perspective view from above of an inside corner portion of the berm unit wall and floor blank 80 shown in FIG. 16 assembled into an erect condition and showing a plurality of inside stays 10 received in and retained by a plurality of stay securement tapes 110, 110', 118, 118', 126, and 126' and showing the threading of an open stay through cooperating apertures 116, 124, and 132 of respective tapes; showing the closure pin 68 and closing pin cap 74 poised for insertion into and retention in the loops 38 and 24 once the loops are interlaced to close the stay into a closed ring; and showing dashed fold lines marking a transition zone between the floor 82 and the sidewall 84.
Figure 19:
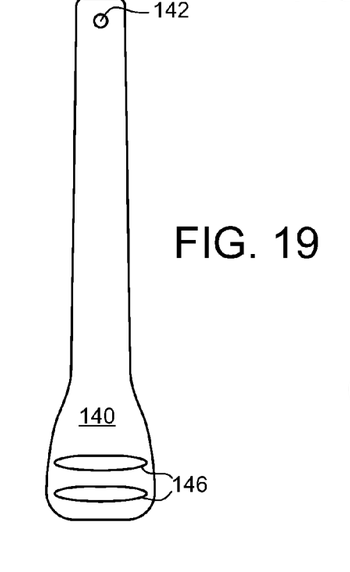
FIG. 19 is a top plan view of a handle and hold-down stay strap 140 showing a stay strap anchor aperture 142 and two stay strap stay apertures 146.
Figure 20:
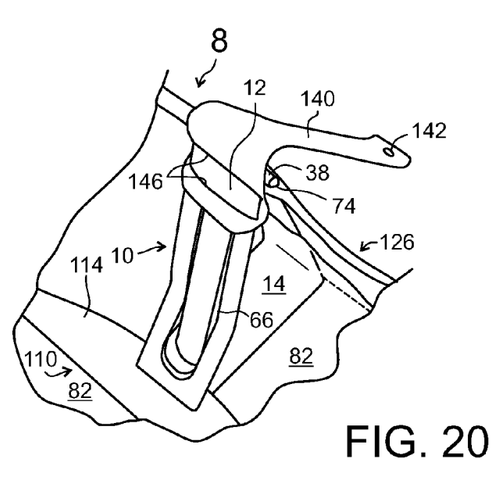
FIG. 20 is a partial perspective view from above of a hold-down stay strap 140 laced onto and connected to a propping leg 12 of a stay 10.
Figure 21:
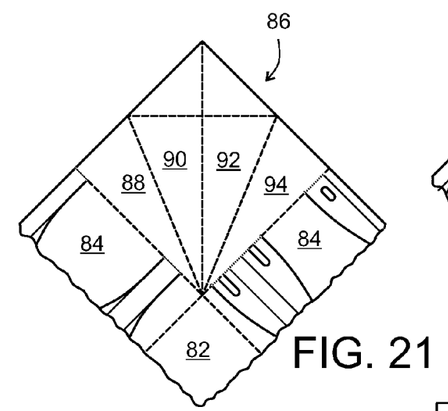
FIG. 21 is a partial top view of a corner portion 86 of the berm unit wall and floor blank 80 shown in FIG. 16 before folding into a formed corner and showing dashed fold lines.
Figure 22:
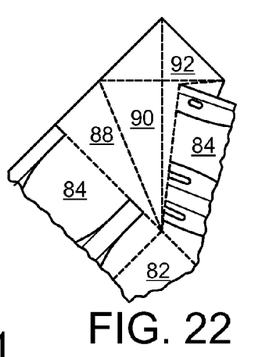
FIG. 22 is a partial perspective view from above of the corner portion shown in FIG. 21 showing an initial fold step in the folding of the corner portion into a formed corner.
Figure 23:
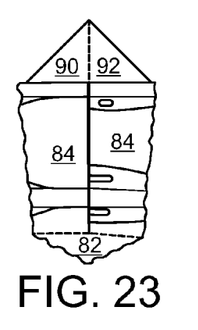
FIG. 23 is a partial perspective view from above of the corner portion shown in FIG. 22 showing a second fold step in the folding of the corner portion into a formed corner.
Figure 24:
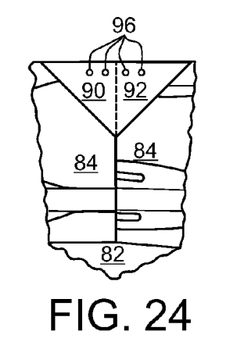
FIG. 24 is a partial perspective view from above of a corner of portion shown in FIG. 23 showing a third fold step in the folding of the corner portion into a formed corner and showing four fastener holes 96.
Figure 25:
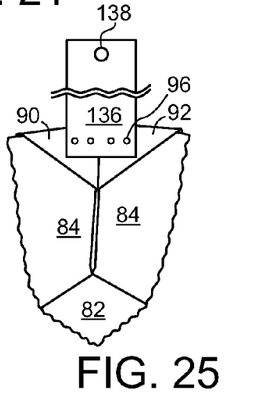
FIG. 25 is a partial perspective view from above of the corner portion shown in FIG. 24 showing the formed corner before an additional folding together into a facing relationship of the upper portions of wedge portions 90, 92 and showing a flexible handle and hold-down anchor strap 136 overlaying for attachment between the wedge portions shown.
Figure 26:
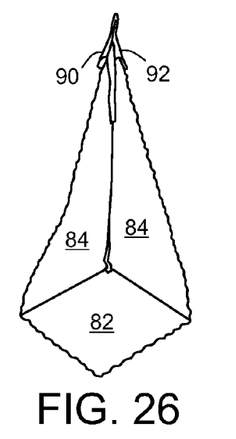
FIG. 26 is a partial perspective view from above of the corner portion shown in FIG. 25 showing the formed corner after the additional folding together into a facing relationship of the upper portions (anchor strap not shown)
Figure 27:
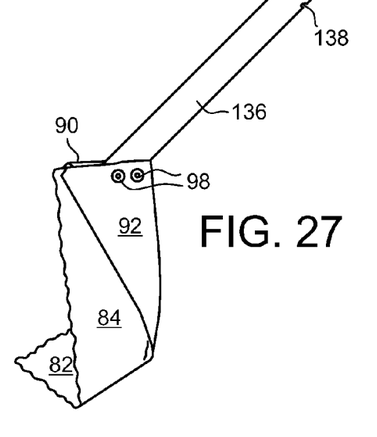
FIG. 27 is a partial perspective view from above and from the outside of the corner portion shown in FIG. 26 showing the formed corner and showing the anchor strap sandwiched between and joined to adjacent and facing portions of the corner portion by joining means (pop rivets 98) in a manner well known in the art and showing the anchor strap partially folded outward and downward away from the interior of the berm unit.
Figure 28:
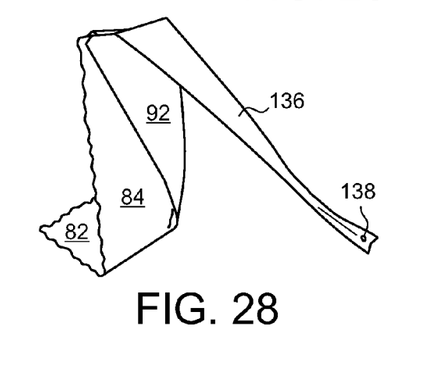
FIG. 28 is a partial perspective view from above and from the outside of the corner portion shown in FIG. 27 showing the anchor strap pulled downward and outward away from the corner portion and folding over the spine of the corner.
Figure 29:
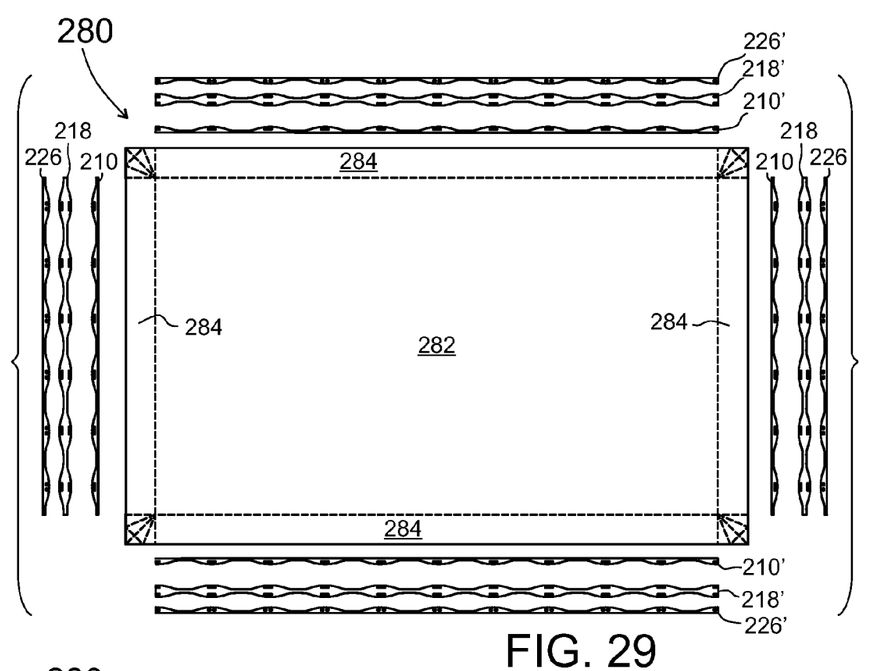
FIG. 29 is an exploded top plan view of an alternative berm unit and showing a flat rectangular berm unit wall and floor blank 280, associated stay securement tapes 210, 210', 218, 218', 226, and 226', and showing dashed fold lines for forming the sidewalls and folded corners and showing a floor portion 282 surrounded by sidewall portions 284.
Figure 30:
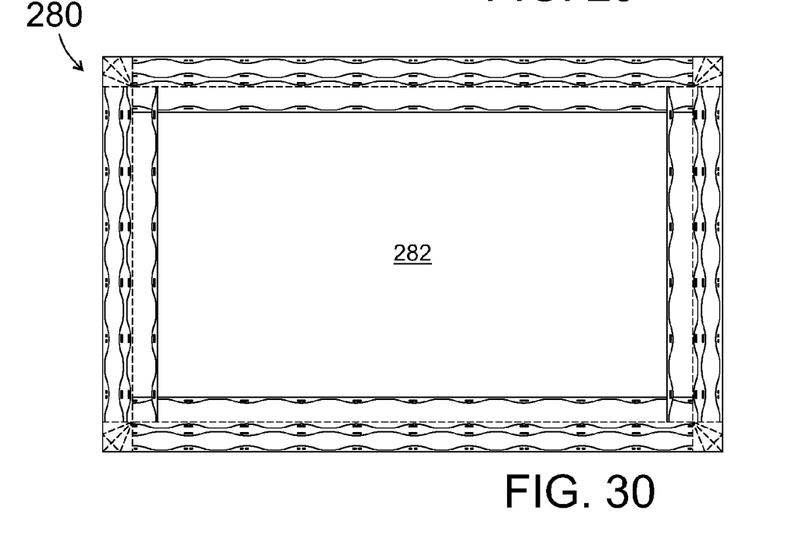
FIG. 30 is a top plan view of the alternative berm unit wall and floor blank 280 shown in FIG. 29 showing fold lines for forming the sidewalls and folded corners and showing the bottom edges of the sidewall portions before folding is done and before insertion and retention of a plurality of inside stays and showing stay securement tapes joined to sidewall portions and stay securement tapes joined to the floor portion 282.
Figure 31:
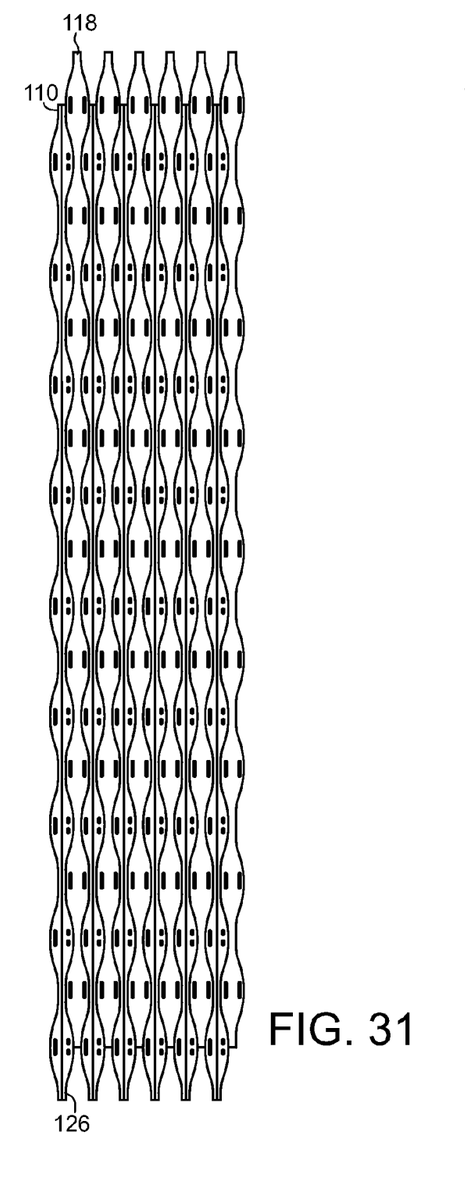
FIG. 31 is a top plan view showing a pattern for a CNC single ply fabric cutter for cutting tessellated stay securement tapes 110, 118, and 126 along common lines with a minimum of waste material.
Figure 32:
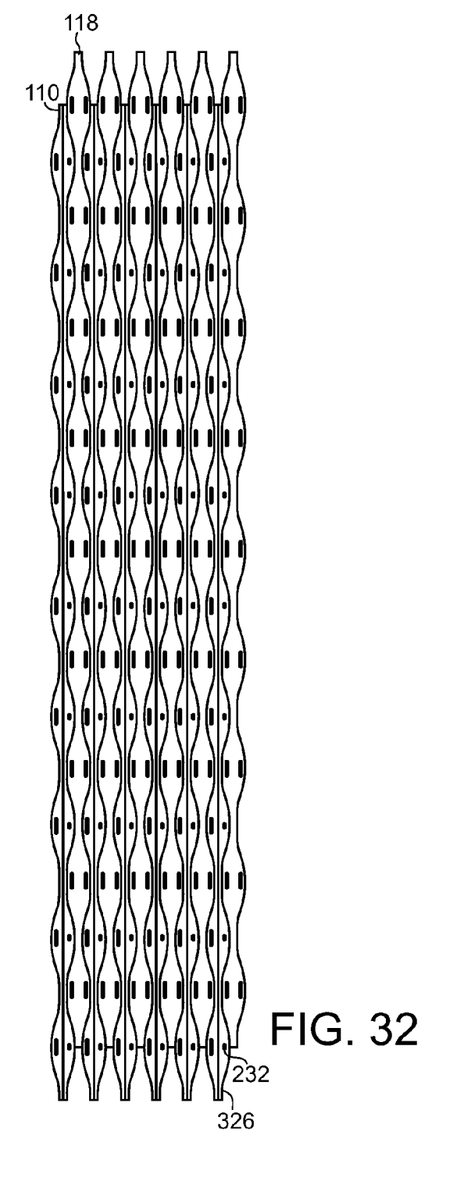
FIG. 32 is a top plan view showing a second pattern for a CNC single ply fabric cutter for cutting tessellated stay securement tapes along common lines with a minimum of waste material and showing an alternative sidewall outer free edge stay securement tape 326 with a plurality of spaced singular wing loop apertures 232 for use with the alternative stays 210 and 410 shown in FIGS. 2b and 2d.

FIGS. 1, 18, and 20 show an inside stay berm unit 8 comprising a flexible berm unit wall and floor blank 80 having a floor portion 82, the floor portion peripherally surrounded and connected to at least one sidewall portion 84, a plurality of inside stays 10 with each respective stay secured between the floor portion and the sidewall portion by a plurality of stay securement tapes 110, 110', 118, 118', 126, and 126'. The stay securement tapes are joined to the blank 80, 280 by joining means, preferably by hot air welding.

Referring to FIGS. 1 through 32, a motor vehicle operator, heavy equipment operator, or other user can possess for ready use a compactly folded, undeployed berm unit 8 conveniently stowed in a motor vehicle, a piece of heavy equipment, or a workplace. The berm unit 8 has a flexible blank 80, 280 having a floor portion 82, 282 and at least one sidewall portion 84, 284 that can be deployed (erected) by stays 10, 210, 310, 410 to contain and control a potential spill of a liquid or other flowing material. When deployed and erected, the berm unit 8 forms an open-topped container.

Referring to FIGS. 2a, 3, 5, and 6, an inside stay 10 comprises a propping leg 12, pivotally connected to a base leg 14, and the base leg pivotally connected to a sidewall leg 16. The inside stay 10 comprises a flat outer stay layer 18 having a male end portion 20 adjacent a propping leg portion 22 adjacent a base leg portion 30 adjacent a sidewall leg portion 32 adjacent a female end portion 34; said male end portion having a male loop 24; said female end portion having a loop forming window 36 located adjacent said sidewall leg portion 32 to form said female end portion into two female loops 38 sized to cooperate with said male loop 24; said propping leg portion 22 having a generally u-shaped propping leg portion slot 26 aligned along said propping leg portion 22 with the legs of said propping leg portion slot 26 aligned towards said male end portion 20 and the bottom of said propping leg portion slot 26 closer towards said base leg portion 30; said propping leg portion slot 26 defining an outer stay layer prop flap 28 between the legs of said propping leg portion slot 26 and defining an initial propping leg window 65; said propping leg portion 22 underlaying in facing opposing relationship a flat intermediate propping leg stay layer 40 and secured by a joining means to said propping leg stay layer 40, said propping leg stay layer 40 having a prop flap portion 42 sized to overlay in facing opposing cooperating relationship said outer stay layer prop flap 28; said prop flap portion 42 having a propping leg registration window 44 centrally located; an intermediate stay layer 46 overlaying in facing opposing relationship and secured by said joining means to said sidewall leg portion 32, said base leg portion 30, and said propping leg portion 22; said intermediate stay layer 46 having an intermediate stay layer free edge 58 said free edge bridging across and blocking over the end of said initial propping leg window 65 away from said male end portion 20 defining a shorter final propping leg window 66; said intermediate stay layer 46 having a base leg registration window 48 centrally located over said base leg portion 30 and a sidewall leg registration window 50 centrally located over said sidewall leg portion 32; a one-piece propping leg reinforcing member 52 or a two-piece propping leg reinforcing member 152 or a three-piece propping leg reinforcing member 252 registered in said propping leg registration window 44 (see FIGS. 7a to 7c); a base leg reinforcing member 54 registered in said base leg registration window 48; a sidewall leg reinforcing member 56 registered in said sidewall leg registration window 50; a flat inner stay layer 60 having an inner stay layer u-shaped slot 62 sized and located to overlay said propping leg portion slot 26 and defining an inner stay layer flap 64 between the legs of said inner stay layer u-shaped slot 62, said inner stay layer 60 overlaying in facing opposing relationship said intermediate propping leg stay layer 40 and said intermediate stay layer 46 and overlaying said reinforcing members and secured by said joining means to said intermediate propping leg stay layer 40 and said intermediate stay layer 46; and a closure means for securing said male end portion to said female end portion.

Preferably, the final propping leg window 66 is shorter in length than the joined outer stay layer prop flap 28, the prop flap portion 42, and the inner stay layer flap 64 that sandwich the propping leg reinforcing member 52, 152, 252 thereby restricting the sandwiched propping leg reinforcing member to a normal position within the closed ring of the stay as shown in FIGS. 2a and 11 to 14; but will allow nondestructive resisted movement of the sandwiched propping leg reinforcing member through the final propping leg window under abnormal or excessive load.

Joining means include radio frequency welding, heat fusing, hot air welding, ultrasonic welding, adhesive gluing, sewing, riveting, or another suitable method of joining known in the art.

Preferably, the male end portion 20 has a male loop 24 formed by folding over and attaching the distal end of the male end portion to said propping leg portion 22 and the female end portion 34 has two spaced coaxial female loops 38 formed by folding over and attaching the distal end of the female end portion to said sidewall leg portion 32 said female loops defined by the parallel sides of the loop forming window 36.

Referring to FIGS. 3, 5, 6, 8 to 10c, preferably, the closure means for each stay comprises a closure pin 68 having a closure pin end cap portion 70 at one end and a closure pin receiving slot 72 at the other end with said closure pin inserted and retained in said male loop 24 and in said female loops 38 after said loops are interlaced coaxially with said male loop between said female loops and secured within said loops by a cooperating slot engaging probe 76 of a closing pin cap 74 engaging and being retained by said receiving slot. Preferably, the closure pin is made of a material with a shape memory such as POM that allows the probe to snap fit into the slot after temporary deformation of the slot by the entrance of the probe.

Figures 2A, 2B:
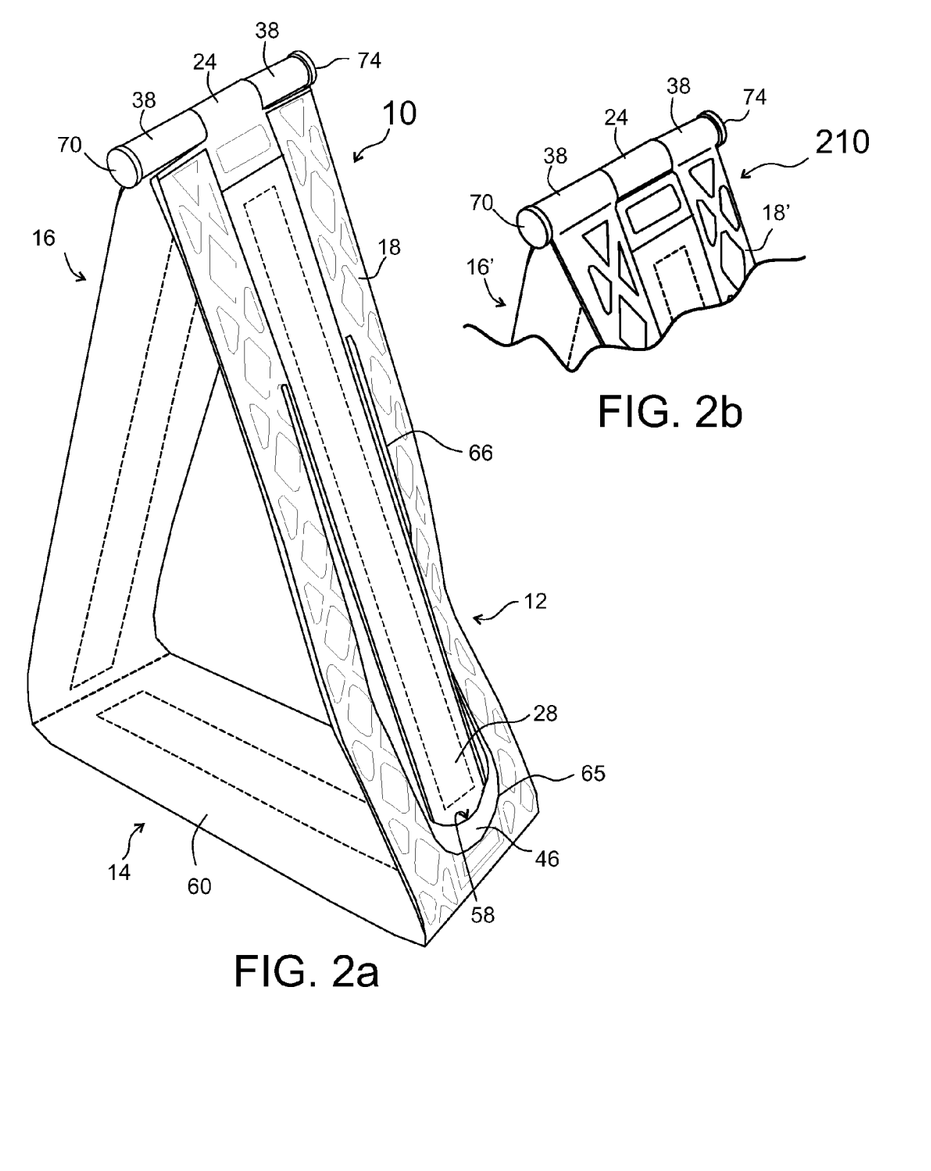
FIG. 2a is a perspective view of a preferred embodiment of the inside stay 10 shown in FIG. 1 having two female loops 38 attached to a sidewall leg 16 said female loops bracketing a male loop 24 attached to a propping leg 18.
FIG. 2b is a partial perspective view of a second embodiment of an inside stay 210 having two female loops 38 attached to a propping leg 18' said female loops bracketing a male loop 24 attached to a sidewall leg 16'.
Figures 2C, 2D:
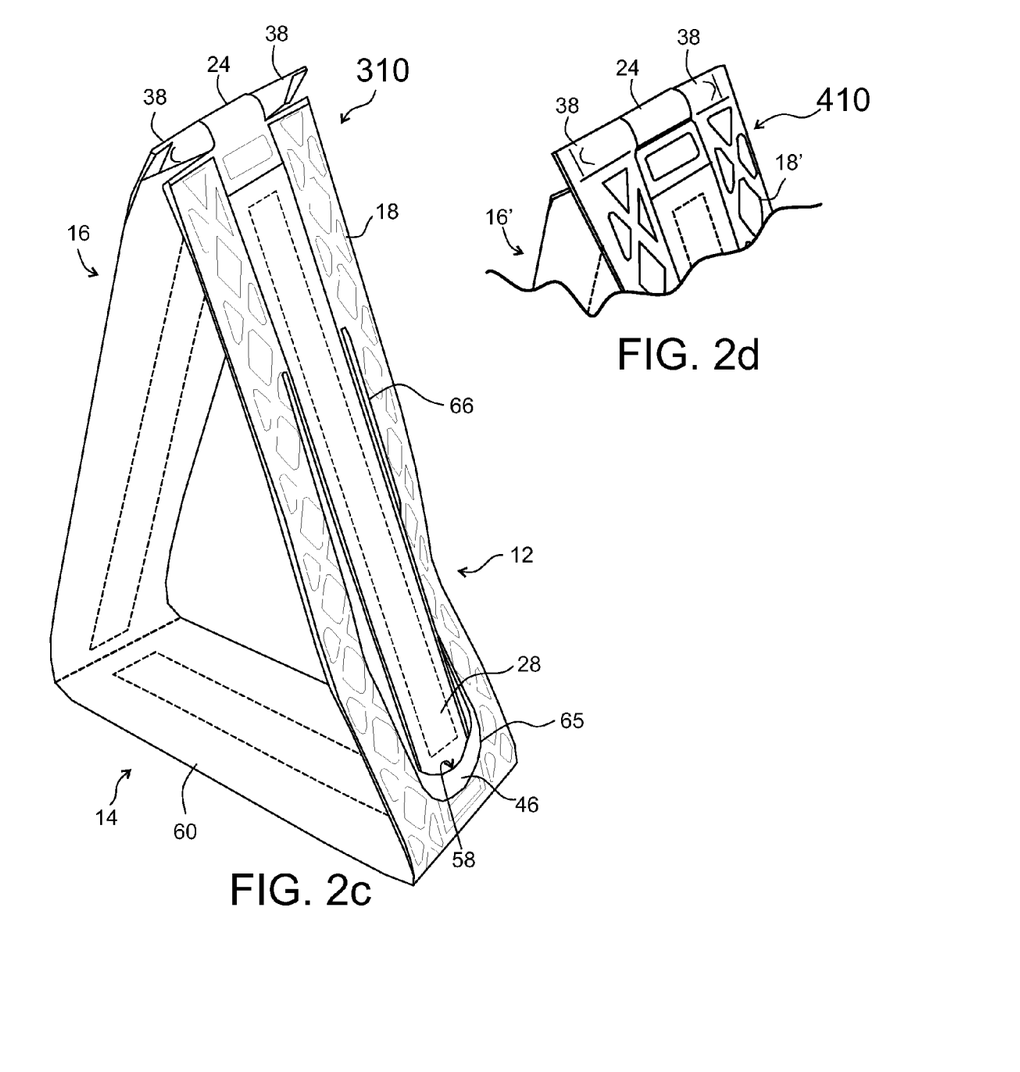
FIG. 2c is a perspective view of a third embodiment of an inside stay 310 having two female loops 38 attached to a sidewall leg 16 said female loops bracketing a male loop 24 attached to a propping leg 18 and showing the outer ends of the female loops sealed.
FIG. 2d is a partial perspective view of a fourth embodiment of an inside stay 410 having two female loops 38 attached to a propping leg 18' said female loops bracketing a male loop 24 attached to a sidewall leg 16' and showing the outer ends of the female loops sealed.
Figure 3:
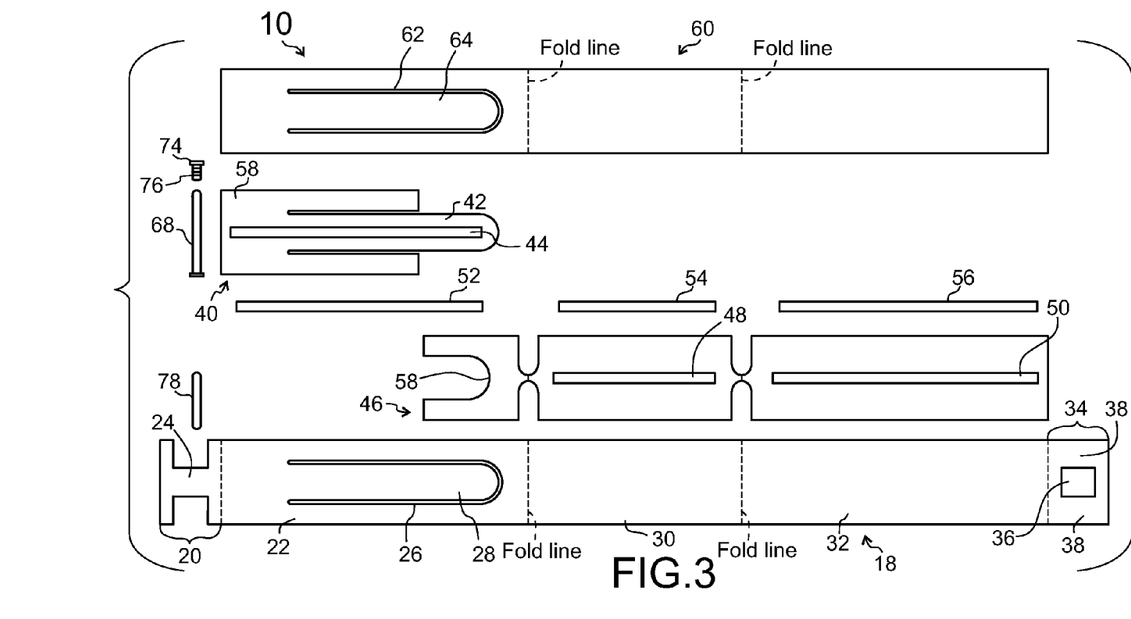
FIG. 3 is a exploded top plan view of the preferred embodiment of the inside stay 10 shown in FIG. 1.
Figure 4:
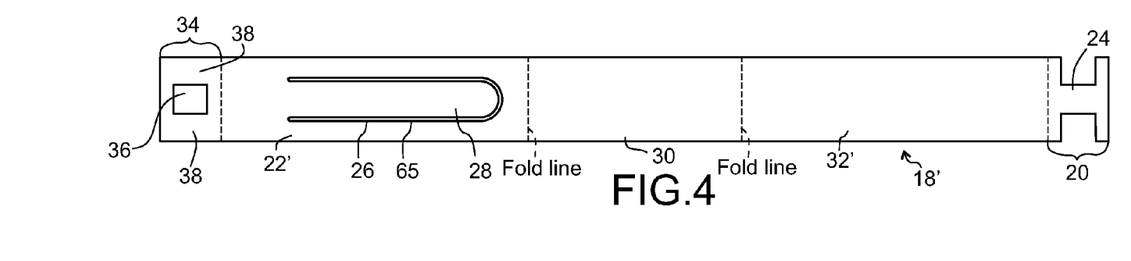
FIG. 4 is a top plan view of an alternative flat outer stay layer 18'.

Alternatively, the closure means for each stay may comprise a closing pin 78 for insertion and retention in said male loop 24 and in said female loops 38 after said loops are interlaced coaxially with said male loop between said female loops. FIGS. 2c and 2d show the outer annular portions of the female loops 38 pinch sealed together in a manner understood in the art and thereby securing within the loops the closing pin 78.

Figure 16:
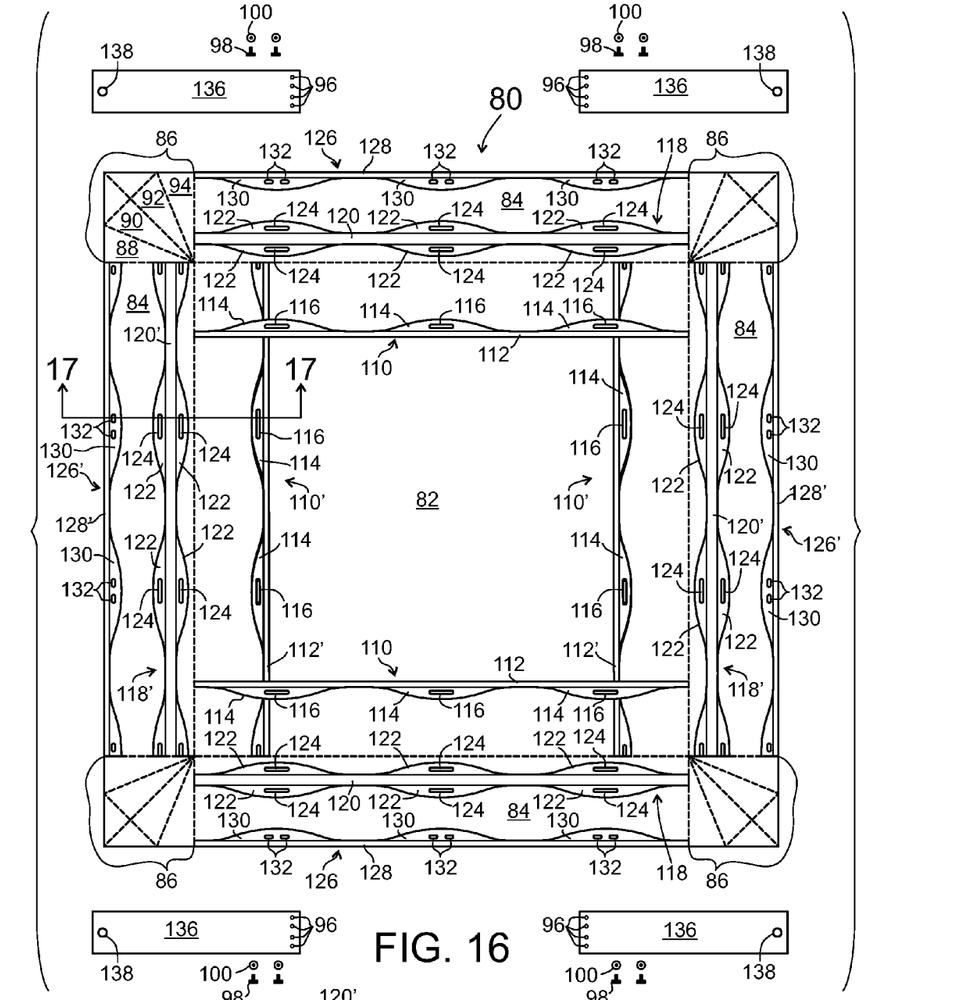
Figure 17:
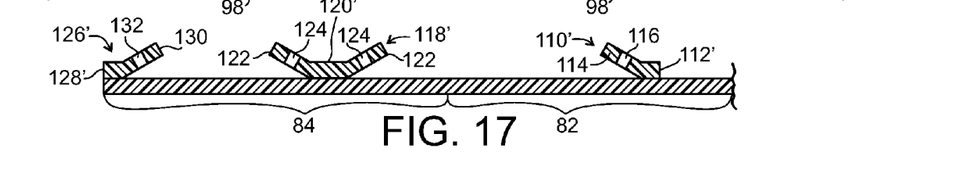
FIG. 17 is a partial cross-sectional view along a line 17-17 shown in FIG. 16 showing the physical relationship between three stay securement tapes and a portion of the sidewall and a portion of the floor.

Referring to FIG. 16 preferably an inside stay berm unit 8 comprises a plurality of stays 10 operatively connected to a flat wall and floor blank 80; said floor blank having a central floor portion 82 surrounded by an encircling sidewall portion 84; said sidewall portion having a sidewall outer free edge; a plurality of floor stay securement tapes 110, 110' distributed around said central floor portion and spaced outward from the center of said floor portion towards said sidewall portion; each said floor stay tape 110, 110' having a joined portion 112, 112' attached to said floor portion by a joining means and each said floor stay tape having a plurality of floor tape wings 114; said floor tape wings each respectively having a floor tape wing aperture 116; a plurality of lower sidewall stay securement tapes 118, 118' distributed along said sidewall portion and spaced from said outer free edge; each said sidewall stay tape 118, 118' having a joined portion 120, 120' attached to said sidewall portion by a joining means and each said sidewall stay tape having a plurality of sidewall tape wings 122; said sidewall tape wings each respectively having a sidewall tape wing aperture 124; and a plurality of sidewall outer free edge stay securement tapes 126, and 126' distributed along and proximal to said outer free edge; each said sidewall outer free edge stay tape 126, 126' having a joined portion 128, 128' attached to said sidewall portion by a joining means and each said sidewall outer free edge stay tape having a plurality of sidewall outer free edge tape wings 130; said sidewall outer free edge tape wings each respectively having a sidewall outer free edge tape wing aperture 132; said stay securement tapes sized for receiving and retaining a plurality of inside stays 10.

Referring to FIGS. 16, 18, and 21 to 28, preferably the floor blank further comprises a plurality of square corner portions 86 of said sidewall portion; each respective corner portion having an inner corner closest to the center of the floor blank and each respective corner portion having a first wedge portion 88 having a vertex at said inner corner adjacent a second wedge portion 90 having a vertex at said inner corner adjacent a third wedge portion 92 having a vertex at said inner corner adjacent a fourth wedge portion 94; preferably said wedge portions each having a vertex angle at said inner corner of about 22.5 degrees; said first wedge portion folded up and over to partially overlay said second wedge portion in facing relationship leaving an uncovered second wedge portion; said fourth wedge portion folded up and over to partially overlay said third wedge portion in facing relationship leaving an uncovered third wedge portion; said uncovered second wedge portion and said uncovered third wedge portion first folded up and over to partially overlay and sandwich portions of said first wedge portion and said fourth wedge portion and second folded inwardly together in facing relationship and secured together by joining means such as rivets 98 and washers 100 in fastener holes 96.

A flexible handle and hold-down anchor strap 136 may attached between said second wedge portion facing said third wedge portion. Hold-down anchor strap 136 preferably has an anchor strap aperture 138.

Joining means include sewing, radio frequency welding, hot air welding, heat fusing, ultrasonic welding, gluing with an adhesive, or another suitable method of joining means known in the art.

The male loop 24 and the cooperating female loops 38 in each stay are closed after incorporation into a berm unit by a closure means. The preferred closure means is a respective closure pin 68 inserted into the interlaced loops (38, 24, 38) of each stay connected to a closing cap 74.

Another closure means can be a respective closing pin 78 inserted into the interlaced loops (38, 24, 38) of each stay and the outer annular ends of the female loops being sealed by a joining means to retain the closing pin within the interlaced loops.

Another closure means can be a flexible closing cable (not shown) substituted for the closure pin 68 to serially close a plurality of stays 10 to hold erect a sidewall 84 of a berm unit. The free ends of the closing cable can be secured one to another to make the assembled berm unit more secure by tying the free ends together or by using a lock mechanism known in the art to selectively lock the free ends together. The flexible closing cable can be a wire cable, a nylon rope, a plastic rope, or a length of cordage made from another suitable material.

The blanks 80 and 280; stay securement tapes 110, 110', 118, 118', 126, and 126', and 326; the anchor strap 130, and the hold-down stay strap 140 can be made from a suitable flexible material such as a coated fabric made of polyester yarn or other suitable yarn coated with a polyurethane coating, a polyvinyl chloride coating, or another coating material that will remain impervious to the transmission of contamination through the material or they can be made from polyethylene sheet material or other suitable sheet material.

The anchor strap 130 and the hold-down stay strap 140 also can be made from a common nylon webbing, coated flexible fabric, or another suitable strap material.

The propping leg reinforcing member 52, the propping leg reinforcing member proximal portion 154, the propping leg reinforcing member distal portion 156, the propping leg reinforcing member alternative proximal portion 254, the propping leg reinforcing member alternative intermediate portion 256, the propping leg reinforcing member alternative distal portion 258, and the base leg reinforcing member 54 preferably are each rod-shaped and selectively made from a generally rigid fiberglass, metal, wood, composite, or other suitable material, but may also be selectively made from a semi-rigid rubber compound having a Shore A hardness of 60 to 90 or from other similar materials with similar flexing and shape-memory properties.

The sidewall leg reinforcing member 56 preferably is rod-shaped and made from a generally rigid fiberglass, metal, wood, plastic, ceramic, composite, or other suitable material, but may also be selectively made from a semi-rigid rubber compound having a Shore A hardness greater than 90.

The closure pin 68, the closing cap 74, and the closing pin 78 preferably are made from acetal plastic commonly known as POM (polyoxymethylene) an engineering thermoplastic also known as polyacetal, but could also be made from a nylon material or other suitable material.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they fairly, legitimately and equitably are entitled.

We claim:

1. An inside stay for an inside stay berm unit comprising
   an outer stay layer 18 having a male end portion 20 adjacent a propping leg portion 22 adjacent a base leg portion 30 adjacent a sidewall leg portion 32 adjacent a female end portion 34;
   said propping leg portion 22 having a generally u-shaped propping leg portion slot 26 aligned along said propping leg portion 22 with the legs of said propping leg portion slot 26 aligned towards said male end portion 20 and the bottom of said propping leg portion slot 26 closer towards said base leg portion 30; said propping leg portion slot 26 defining an outer stay layer prop flap 28 between the legs of said propping leg portion slot 26 and defining an initial propping leg window 65;
   said propping leg portion 22 underlaying in facing opposing relationship an intermediate propping leg stay layer 40 and secured by a joining means to said propping leg stay layer 40, said propping leg stay layer 40 having a prop flap portion 42 sized to overlay in facing opposing cooperating relationship said outer stay layer prop flap 28;
   said prop flap portion 42 having a propping leg registration window 44 centrally located;
   an intermediate stay layer 46 overlaying in facing opposing relationship and secured by said joining means to said sidewall leg portion 32, said base leg portion 30, and said propping leg portion 22;
   said intermediate stay layer 46 bridging across and blocking over the end of said initial propping leg window 65 away from said male end portion 20 defining a shorter final propping leg window 67;
   said intermediate stay layer 46 having a base leg registration window 48 centrally located over said base leg portion 30 and a sidewall leg registration window 50 centrally located over said sidewall leg portion 32;
   a propping leg reinforcing member 52 registered in said propping leg registration window 44;
   a base leg reinforcing member 54 registered in said base leg registration window 48;
   a sidewall leg reinforcing member 56 registered in said sidewall leg registration window 50;
   an inner stay layer 60 having an inner stay layer u-shaped slot 62 sized and located to overlay said propping leg portion slot 26 and defining an inner stay layer flap 64 between the legs of said inner stay layer u-shaped slot 62, said inner stay layer 60 overlaying in facing opposing relationship said intermediate propping leg stay layer 40 and said intermediate stay layer 46 and overlaying said reinforcing members and secured by said joining means to said intermediate propping leg stay layer 40 and said intermediate stay layer 46, and
   a closure means for securing said male end portion to said female end portion.

2. An inside stay according to claim 1 wherein said joining means include radio frequency welding, heat fusing, ultrasonic welding, adhesive gluing, sewing, riveting, or another suitable method of joining known in the art.

3. An inside stay according to claim 1 wherein said male end portion 20 having a male loop 24, said female end portion having two spaced coaxial female loops 38, said closure means comprising a closing pin 78 for insertion and retention in said loops after said loops are interlaced coaxially with said male loop between said female loops.

4. An inside stay according to claim 1 wherein said male end portion 20 having a male loop 24, said female end portion having two spaced coaxial female loops 38, said closure means comprising a closure pin 68 having a closure pin end cap portion 70 at one end and a closure pin receiving slot 72 at the other end for insertion in said loops after said loops are interlaced coaxially with said male loop between said female loops and retention in said loops by a closing cap 74 inserted into and retained in said receiving slot.

5. An inside stay according to claim 2 wherein said propping leg reinforcing member is semi-rigid having a Shore A hardness of 60 to 90.

6. An inside stay according to claim 3 wherein said propping leg reinforcing member is semi-rigid having a Shore A hardness of 60 to 90.

7. An inside stay according to claim 4 wherein said propping leg reinforcing member is semi-rigid having a Shore A hardness of 60 to 90.

8. An inside stay according to claim 4 wherein said propping leg reinforcing member is generally rigid.

9. A plurality of inside stays in combination with a berm unit said berm unit comprising
   a berm unit wall and floor blank, said floor blank having a floor peripherally surrounded by and connected to at least one sidewall, said floor having at least one floor stay securement tape attached and spaced towards the center of said floor from said sidewall;
   said sidewall having an inward sidewall surface and a free upper edge and having a plurality of sidewall stay securement tapes attached to said inward sidewall surface spaced from and distributed upwards away from said floor and towards said free upper edge to receive and retain each said respective inside stay;
   each said floor stay securement tape in a cooperating relationship with respective said sidewall stay securement tapes to receive and retain each said respective inside stay, wherein each said inside stay comprises: an outer stay layer 18 having a male end portion 20 adjacent a propping leg portion 22 adjacent a base leg portion 30 adjacent a sidewall leg portion 32 adjacent a female end portion 34;
   said propping leg portion 22 having a generally u-shaped propping leg portion slot 26 aligned along said propping leg portion 22 with the legs of said propping leg portion slot 26 aligned towards said male end portion 20 and the bottom of said propping leg portion slot 26 closer towards said base leg portion 30; said propping leg portion slot 26 defining an outer stay layer prop flap 28 between the legs of said propping leg portion slot 26 and defining an initial propping leg window 65;
   said propping leg portion 22 underlaying in facing opposing relationship an intermediate propping leg stay layer 40 and secured by a joining means to said propping leg stay layer 40, said propping leg stay layer 40 having a prop flap portion 42 sized to overlay in facing opposing cooperating relationship said outer stay layer prop flap 28;
   said prop flap portion 42 having a propping leg registration window 44 centrally located;

an intermediate stay layer 46 overlaying in facing opposing relationship and secured by said joining means to said sidewall leg portion 32, said base leg portion 30, and said propping leg portion 22;

said intermediate stay layer 46 bridging across and blocking over the end of said initial propping leg window 65 away from said male end portion 20 defining a shorter final propping leg window 67;

said intermediate stay layer 46 having a base leg registration window 48 centrally located over said base leg portion 30 and a sidewall leg registration window 50 centrally located over said sidewall leg portion 32;

a propping leg reinforcing member 52 registered in said propping leg registration window 44;

a base leg reinforcing member 54 registered in said base leg registration window 48;

a sidewall leg reinforcing member 56 registered in said sidewall leg registration window 50;

an inner stay layer 60 having an inner stay layer u-shaped slot 62 sized and located to overlay said propping leg portion slot 26 and defining an inner stay layer flap 64 between the legs of said inner stay layer u-shaped slot 62, said inner stay layer 60 overlaying in facing opposing relationship said intermediate propping leg stay layer 40 and said intermediate stay layer 46 and overlaying said reinforcing members and secured by said joining means to said intermediate propping leg stay layer 40 and said intermediate stay layer 46, and a closure means for securing said male end portion to said female end portion.

10. An inside stay according to claim 9 wherein said joining means include radio frequency welding, heat fusing, ultrasonic welding, adhesive gluing, sewing, riveting, or another suitable method of joining known in the art.

11. An inside stay according to claim 9 wherein said male end portion 20 having a male loop 24, said female end portion having two spaced coaxial female loops 38, said closure means comprising a closing pin 78 for insertion and retention in said loops after said loops are interlaced coaxially with said male loop between said female loops.

12. An inside stay according to claim 9 wherein said male end portion 20 having a male loop 24, said female end portion having two spaced coaxial female loops 38, said closure means comprising a closure pin 68 having a closure pin end cap portion 70 at one end and a closure pin receiving slot 72 at the other end for insertion in said loops after said loops are interlaced coaxially with said male loop between said female loops and retention in said loops by a closing cap 74 inserted into and retained in said receiving slot.

13. An inside stay according to claim 9 wherein said propping leg reinforcing member is semi-rigid having a Shore A hardness of 60 to 90.

14. An inside stay according to claim 11 wherein said propping leg reinforcing member is semi-rigid having a Shore A hardness of 60 to 90.

15. An inside stay according to claim 12 wherein said propping leg reinforcing member is semi-rigid having a Shore A hardness of 60 to 90.

16. An inside stay according to claim 12 wherein said propping leg reinforcing member is generally rigid.

\* \* \* \* \*